(12) United States Patent
Janssen et al.

(10) Patent No.: US 11,072,873 B2
(45) Date of Patent: Jul. 27, 2021

(54) ELECTROSPINNING DEVICE AND METHOD

(71) Applicant: Innovative Mechanical Engineering Technologies B.V., Waalre (NL)

(72) Inventors: Paul Johannes Franciscus Maria Janssen, Eindhoven (NL); Ramon Hubertus Mathijs Solberg, Munstergeleen (NL)

(73) Assignee: Innovative Mechanical Engineering Technologies B.V, Waalre (NL)

( * ) Notice: Subject to any disclaimer, the term of this patent is extended or adjusted under 35 U.S.C. 154(b) by 367 days.

(21) Appl. No.: 16/094,540

(22) PCT Filed: Apr. 20, 2017

(86) PCT No.: PCT/EP2017/059376
§ 371 (c)(1),
(2) Date: Oct. 18, 2018

(87) PCT Pub. No.: WO2017/182560
PCT Pub. Date: Oct. 26, 2017

(65) Prior Publication Data
US 2019/0119830 A1 Apr. 25, 2019

(30) Foreign Application Priority Data
Apr. 21, 2016 (NL) .................................. 20166852

(51) Int. Cl.
*D01D 5/00* (2006.01)
*D01D 13/00* (2006.01)
(Continued)

(52) U.S. Cl.
CPC ......... *D01D 5/0061* (2013.01); *B29C 41/006* (2013.01); *D01D 5/0007* (2013.01);
(Continued)

(58) Field of Classification Search
CPC ........................... D01D 5/0007; D01D 5/0061
See application file for complete search history.

(56) References Cited

U.S. PATENT DOCUMENTS

| 4,456,379 A | * | 6/1984 | Schumann ......... G01B 11/0616 356/631 |
| 5,017,869 A | * | 5/1991 | Oliver .................... G01B 7/105 324/230 |

(Continued)

FOREIGN PATENT DOCUMENTS

| CN | 201816214 A | 5/2011 |
| JP | 2012122155 A | 6/2012 |

OTHER PUBLICATIONS

International Search Report of PCT/EP20171059376, dated Jun. 6, 2017.

*Primary Examiner* — Atul P. Khare
(74) *Attorney, Agent, or Firm* — N.V. Nederlandsch Octrooibureau; Catherine A. Shultz; Katelyn J. Bernier (57) ABSTRACT

An electrospinning device is provided with a container for holding a liquid comprising a polymer melt or a polymer solution, and a nozzle arranged to outlet a stream of the liquid from the container. A collector collects electro spun material during electrospinning so as to form a fibrous structure. The device comprises an optical measurement system that measures a baseline distance between the collector and the optical measurement system for at least one location on a surface of the collector, and also measures a momentary distance between the optical measurement system and a momentary top layer of the fibrous structure during the electrospinning process. A processor calculates a momentary thickness of the fibrous structure. Once a required thickness is reached the electrospinning can be stopped.

20 Claims, 7 Drawing Sheets

(51) Int. Cl.
 *D04H 1/728* (2012.01)
 *B29C 41/00* (2006.01)
 *D01D 13/02* (2006.01)
 *D04H 1/70* (2012.01)

(52) U.S. Cl.
 CPC ........... *D01D 5/0076* (2013.01); *D01D 13/00* (2013.01); *D01D 13/02* (2013.01); *D04H 1/70* (2013.01); *D04H 1/728* (2013.01)

(56) References Cited

U.S. PATENT DOCUMENTS

| | | | | |
|---|---|---|---|---|
| 5,800,615 | A * | 9/1998 | Lambert | B05B 5/08 |
| | | | | 118/326 |
| 7,625,198 | B2 * | 12/2009 | Lipson | A61L 27/36 |
| | | | | 425/174 |
| 9,445,874 | B2 * | 9/2016 | Soletti | A61F 2/04 |
| 9,723,866 | B2 * | 8/2017 | Lipson | B33Y 70/00 |
| 2009/0130301 | A1 | 5/2009 | Bahnmuller et al. | |
| 2011/0143019 | A1 * | 6/2011 | Mosso | C23C 16/545 |
| | | | | 427/58 |
| 2013/0317285 | A1 | 11/2013 | Soletti et al. | |
| 2013/0337101 | A1 | 12/2013 | McGrath et al. | |

\* cited by examiner

ELECTROSPINNING DEVICE AND METHOD

FIELD OF THE INVENTION

The invention relates to an electrospinning device and a method of producing a fibrous structure using such a device. The invention also relates to a measuring device for measuring a thickness of a fibrous structure and to a method of measuring a thickness of a fibrous structure.

BACKGROUND ART

Electrospinning is a method to produce continuous fibers with a diameter ranging from a few tens of nanometres to a few tens of micrometres. To electrospin fibers, a suitable liquefied material may be fed through a small, electrically conductive nozzle. The liquefied material may be electrically charged by applying a high voltage between the nozzle and a counter electrode. The generated electric field causes a cone-shape deformation of the droplet at the nozzle tip. Once the surface tension of this droplet is overcome by the electrical force, a jet is formed out of the droplet and a fiber forms that moves towards the counter electrode. During the flight towards the counter electrode the fiber is continuously stretched and elongated by the different forces acting on it, reducing its diameter and allowing it to solidify (by evaporation of the solvent or cooling of the material) such that a solid fiber is deposited on the collector (which is placed just before the counter electrode or the counter electrode is used as collector directly).

When an electrospinning process is run for a certain time, a structure of fibrous layers is formed on the counter electrode or collector. Due to the extremely small fiber diameter and the porous nature of this structure, it is difficult to accurately measure the thickness of the resulting fibrous structure because the structure's surface consists of very thin fibers and is hence compressible. Furthermore, the structure's surface is not smooth but consists of a (random or oriented) mesh of fibers and pores.

Thickness measurement methods that require direct contact with the structure will yield inaccurate results since the mechanical contact of the measuring device will compress the fibrous structure. Other measuring methods like SEM and light microscopy are destructive since they require slicing of the fibrous structure to allow the measurement system to "look" at the cross-section of the structure.

SUMMARY OF THE INVENTION

Drawback of the known methods for thickness measurement on electrospun fibrous structures is that they can only be applied after the fibrous structure is produced and hence not in situ.

One of the objects of the present invention is provide an electrospinning device that enables in-situ measuring of a thickness of the produced fibrous structure.

A first aspect of the invention provides an electrospinning device comprising:
a container for holding a liquid comprising a polymer melt or a polymer solution;
a nozzle arranged to outlet a stream of the liquid from the container;
a collector for collecting electro spun material coming from the nozzle during an electrospinning process so as to form a fibrous structure on a surface of the collector;
a voltage supply system arranged to create a voltage difference between the nozzle and the collector,
an optical measurement system arranged to measure a baseline distance between the surface of the collector and the optical measurement system at at least one predefined location, and to repeatedly measure a momentary distance between a momentary top layer of the fibrous structure and the optical measurement system at the at least one predefined location during the electrospinning process;
a processor arranged to receive the measured baseline distance and the momentary distance from the optical measurement system and to calculate a momentary thickness of the fibrous structure for the at least one location.

By using an optical measurement system in an electrospinning device that measures a distance to the collector and a distance to the momentary top layer, an in-situ measurement is possible. A momentary thickness can be calculated at one location or at a plurality of locations. These locations could be predefined by a user or operator by providing one or more coordinates.

During the electrospinning process, the device is measuring the thickness of the electro spun fibrous structure being produced. This will give an improved control over the production process, as compared to known thickness measurements in which measurements are done after the spinning process. Furthermore, the fibrous structure does not need to be touched or cut into pieces. The thickness can be measured very accurately by measuring the distance from the collector to the optical measurement system and the distance from the (momentary) top layer to the optical measurement system at the at least one location. By also measuring the distance from the collector to the optical measurement system, a kind of initial height map or baseline can be made, so that fluctuations in the collector surface are corrected for. In case the collector is a rotatable collector, the fluctuations due to of axis orientation of the collector can also be compensated for.

In an embodiment, the collector is movably arranged relative to the nozzle. In this way relatively large collectors can be used that may be covered with electro spun material over a wide area resulting in large fibrous structures. Furthermore, by moving the nozzle relative to the collector, both even and uneven distribution of fibers and thus structure thickness on the collector are possible.

In an embodiment, the optical measurement system is movably arranged relative to the surface of the collector. In this way, one measurement system can be used to measure at several locations on the collector. Alternatively, the optical measurement system is statically arranged relative to a surface of the collector so as to measure at a single location. In this embodiment, no moving device element are needed and the measurement system will be able to very accurately measure a distance in situ. Optionally, several measurement systems may be used, such as several triangulation sensors, arranged at different predefined locations relative to the collector.

In an embodiment, the processor is arranged to control at least one out of the following:
the voltage difference;
a material feed through the nozzle;
a nozzle position relative to the collector;
in dependency on the calculated momentary thickness of the fibrous structure at the at least one of the predefined location.

So in this embodiment, the feedback of the momentary thickness is used to control or adjust the voltage difference and/or the material feed and/or the nozzle position relative to the collector. This online feedback of the measured thickness results in a controlled production of the structure and enables a continuation of the spinning process towards a predefined target structure thickness. Besides, a reduction of waste of electrospinning material may be achieved as compared to known devices.

In an embodiment the processor is arranged to control the voltage supply system so as to stop the electrospinning process once a required thickness of the fibrous structure has been reached. This provides for the ability to continue the spinning process towards a predefined structure thickness. Also an additional reduction of waste of electrospinning material may be achieved.

In an embodiment, the processor is arranged to control a movement of the collector relative to the nozzle so as to produce different thickness of the fibrous structure at different locations. In this way, more complex fiber structures can be created that have different thickness at different locations.

In an embodiment the collector is rotatable around a rotation axis. The collector may be cylindrical or have a more complex freeform shape. When using such rotating shapes, a multiple number of structures are conceivable. A relatively simple structure may be a tubular structure that could be used as a stent in the medical field. The tubular structure may also be cut and flattened after the spinning process to create a substantially flat layer of electro spun material.

In an embodiment, the optical measurement system comprises a laser device and an optical sensor, wherein the laser device is arranged to send a light beam towards the collector and the sensor is arranged to measure reflected radiation coming from the collector and/or the fibrous structure.

As mentioned above, optical measurement makes contactless measurement possible and no damage to the fibrous structure will occur. The optical system may comprise a laser and an optical sensor that can be placed at a certain distance away from the collector to avoid interference of the measurement system during the electrospinning process.

In an embodiment, the optical sensor is a 1D or 2D sensor array arranged to detect radiation along at least one axis, wherein the processor is arranged to translate radiation intensities along the axis of the sensor into a reflection curve and to detect a first peak in the reflection curve, wherein the first peak is used by the processor to determine the distance between either the collector or the momentary top layer of the fibrous structure and the optical measurement system.

By using the first peak of the reflection curve, a reproducible distance measurement for the different types of reflection surfaces, being solid or porous, is possible.

In a specific embodiment, the optical measurement system comprises a laser triangulation sensor. Such a sensor is both contactless, accurate and cost-effective. Moreover, a relatively long distance between the optical measurement system and the collector can be used so that interference of the measurement device with can be avoided.

In an embodiment, the laser device is arranged to produce a laser beam having a cross section between 25 µm and 5000 µm, preferably between 70 and 2500 µm. The spot produced by the laser may be circular-, oval- or line shaped. The preferred cross section of the laser beam is large enough to cover a number of fibers and pores at the momentary top layer of the electro spun fibrous structure to yield sufficient reflection (detectable amount of radiation intensity) from the momentary top layer of the electro spun fibrous structure, although small enough to be able to distinguish between small height (distance) differences in a region of interest on the momentary top layer of the electro spun fibrous structure.

In an embodiment, the device comprises a user interface wherein the processor is arranged to receive predefined coordinates from a user via the user interface. The user may freely select one or more coordinates at which the thickness of the fibrous structure is calculated. Selection of the coordinates may be done by the user or operator interacting with control software loaded on the processor prior to the measurement.

In an embodiment, the electrospinning device further comprises a position measurement system arranged to measure a position of the collector relative to the optical measurement system. The processor may then be arranged to receive position information from the position measurement system and to trigger the optical measurement system in dependency on the received position information. A user may define some measurement locations on the collector at which a measurement is desired. These locations may be programmed in a so-called trigger controller incorporated in the processor that triggers the acquisition of a measurement point with the optical measurement system on the selected measurement positions. In this way it is possible to measure repeatedly and accurately at exactly the predefined coordinates.

According to a further aspect there is provided a measuring device for measuring a thickness of a fibrous structure, the measuring device comprising:

a frame;

optionally, a rotatable drive shaft;

a carrier for supporting the fibrous structure, the carrier being detachable from the frame and/or the drive shaft;

an optical measurement system movably coupled to the frame and arranged to measure a baseline distance between the carrier and the optical measurement system for at least one location on the carrier, and arranged to measure a top layer distance between a top layer of the fibrous structure and the optical measurement system, at the at least one locations, and a processor arranged to receive the measured baseline distance and the top layer distance for the at least one location from the optical measurement system and to calculate a thickness of the fibrous structure for all the locations.

The measuring device can be used to calculate a thickness of an electro spun fibrous structure produced in an electrospinning device. The electro spun fibrous structure can be transported from the electrospinning device to the measurement device by detaching the collector from the electrospinning device, and by attaching (i.e. mounting) the collector (with the fibrous structure on it) to the measurement device. In this way, the fibrous structure does not need to be removed from the collector and thus not need to be touched, thereby avoiding damages to the fibrous structure.

In an embodiment the measuring device further comprises a position measurement system arranged to measure a position of the carrier relative to the optical measurement system, wherein the processor is arranged to receive position information from the position measurement system and to trigger the optical measurement system in dependency on the received position information. The position-based triggering of the optical measurement system enables an accurate repetition of the measurements at the predefined coordinates (e.g. to measure baseline and top layer distance at exactly the same coordinate so the difference calculation is representative for the thickness of the fibrous structure at that coordinate).

In an embodiment, the measuring device comprises a mounting system to install the carrier with a fixed orientation relative to the frame.

In an embodiment, the carrier is movable relative to the optical measurement system in at least one dimension. This enables the measuring of the thickness for multiple coordinates.

In an embodiment, the carrier is substantially cylindrical and rotatable relative to the optical measurement system. This enables the measuring of tubular structures or other freeform or 3D structures.

According to a further aspect there is provided a method of producing a fibrous structure, the method comprising:

providing an electrospinning device comprising a collector and an optical measurement system;

optically measuring a baseline distance between the collector and the optical measurement system for at least one location on a surface of the collector;

creating an electro spun fibrous structure on the collector by way of electrospinning using the electrospinning device;

and while electrospinning, optically measuring a momentary distance between a momentary top layer of the fibrous structure and the optical measurement system for the at least one location;

processing the measured baseline distance and the momentary distance for the at least one location during the electrospinning process to calculate a momentary thickness of the fibrous structure for the at least one location.

In an embodiment the method comprises:

stopping the electrospinning process, or only continuing electrospinning at certain areas of the collector, depending on the calculated momentary thickness.

According to yet a further aspect, there is provided a method of measuring a thickness of a fibrous structure, the method comprising:

mounting a collector without an electro spun fibrous structure on it into a measurement device comprising an optical measurement system;

optically measuring a baseline distance between a surface of the collector and the optical measurement system at at least one location on the collector;

removing the collector from the measurement device and placing the collector in an electrospinning device for creation of an electro spun fibrous structure on the collector;

mounting the collector with the electro spun fibrous structure on it into the measurement device;

optically measuring a top layer distance between a top layer of the fibrous structure and the optical measurement system at the at least one location;

processing the measured baseline distance and the top layer distance for the at least one location to calculate a thickness of the fibrous structure.

This method may be applied to check the quality of electro spun fibrous structures by comparing the actual thickness with a desired or required value. An advantage of this method is that it allows for using special measurement devices that comprise measuring configurations not possible in the electrospinning devices that may have insufficient space for a measurement device.

BRIEF DESCRIPTION OF THE DRAWINGS

These and other aspects of the invention are apparent from and will be elucidated with reference to the embodiments described hereinafter. In the drawings, FIG. 1 schematically shows a side view of a first embodiment of the electrospinning device.

It should be noted that items which have the same reference numbers in different Figures, have the same structural features and the same functions, or are the same signals. Where the function and/or structure of such an item has been explained, there is no necessity for repeated explanation thereof in the detailed description.

DETAILED DESCRIPTION OF EMBODIMENTS

Figure 1:
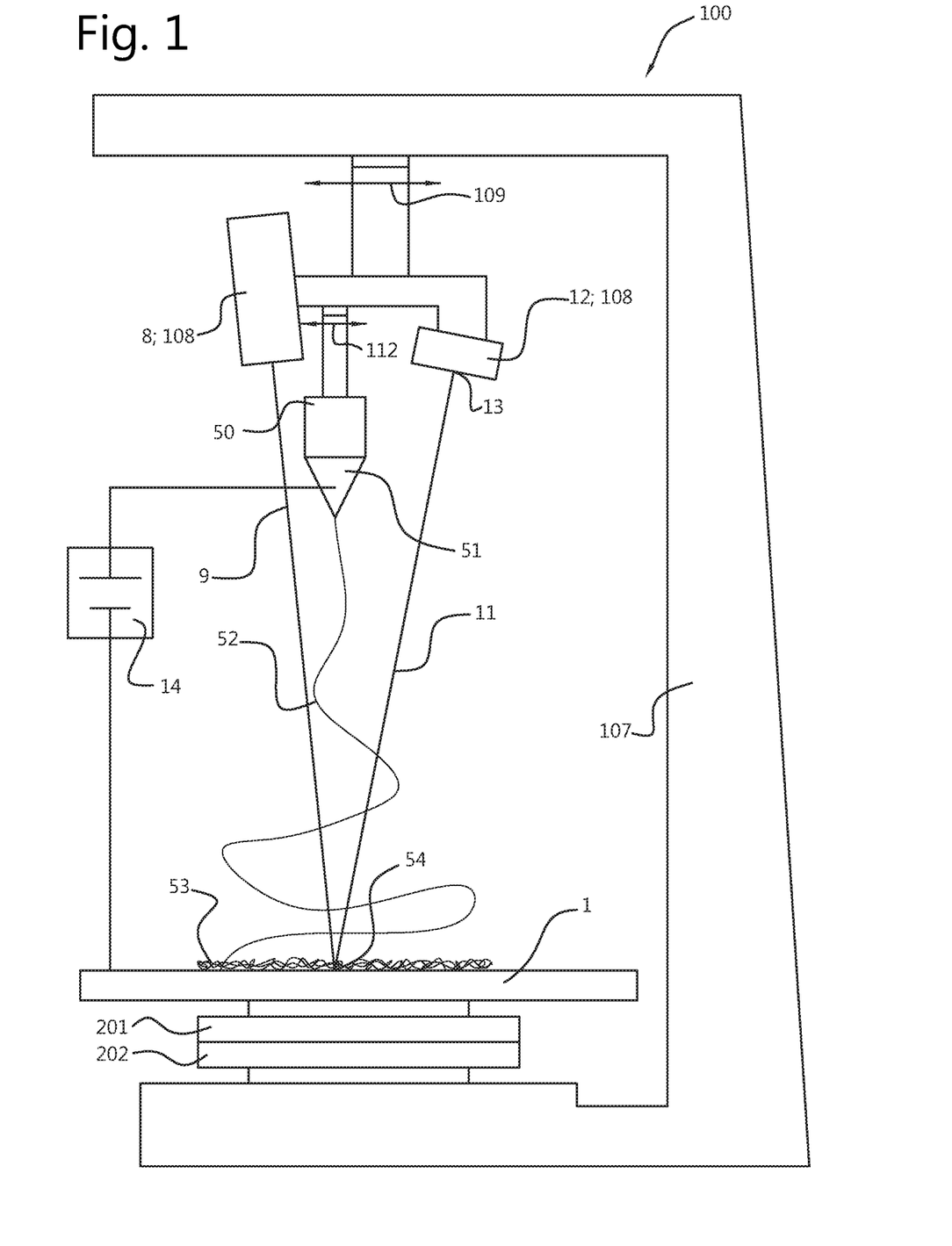

FIG. 1 schematically shows a side view of a first embodiment of the electrospinning device 100. In this example, the device 100 comprises a container 50 for holding a liquid comprising a polymer melt or a polymer solution, and a nozzle 51 arranged to outlet a stream of the liquid from the container 50. It should be noted that the container 50 can be arranged remote from the nozzle 51 wherein it is in fluidic connection with the nozzle 51 by means of for example a tube. The device 100 further comprises a collector 1 for collecting electro spun material coming from the nozzle 51 during an electrospinning process. A voltage supply system 14 is arranged to create a voltage difference between the nozzle 51 and the collector 1. The voltage supply system 14 may comprise one AC or DC voltage supply to create the voltage difference or it may comprise two voltage supplies, one creating a voltage difference between the collector 1 and ground and one creating a difference between the nozzle 51 and ground. Due to the applied voltage(s), an electro spun fiber 52 is created that flies from the nozzle 51 to the collector 1 on which it is collected to form an electro spun fibrous structure 53.

The electrospinning device 100 also comprises an optical measurement system (OMS) 108 arranged to measure a distance between the collector 1 or the electro spun fibrous structure 53 and a reference point 13 of the OMS 108. In this example, the OMS 108 comprises a laser 8 and an optical sensor 12. The reference point 13 is situated at the front of the optical sensor 12. It is noted that the reference point 13 can be located at other locations, as will be clear to the skilled person. The reference point 13 can be used in the processing of the measured signals in order to calculate an absolute distance if needed. The laser 8 is arranged to create a laser beam 9 which is directed to the collector 1 and depending on the situation, hits the empty collector 1 or the electro spun fibrous structure 53 at a measurement position 54. The measurement position 54 can correspond to a predefined coordinate at which a distance measurement is to be taken. The laser beam 8 is reflected by the collector and/or by the electro spun fibrous structure 53 on the collector 1 and is detected by the optical sensor 12 as a reflected beam 11.

The electrospinning device 100 also comprises a processor 111. The processor 111 is arranged to receive the measured distances for at least one location on the collector 1 from the OMS 108 before the electrospinning process and also during the electrospinning process. The processor 111 is arranged to calculate a momentary thickness during the electrospinning process of the fibrous structure for the at least one location using the received distances.

The electrospinning device 100 may comprise a metrology frame 107 arranged to support the collector 1 and the OMS 108. In the example of FIG. 1, the OMS 108 can be moved and positioned relative to the metrology frame 107 by means of OMS positioning module 109 indicated in FIG. 1 by way of arrows 109. The arrows 109 indicate that the movement of the OMS 108 relative to the metrology frame 107 is possible in up to six degrees of freedom (DOF). As shown by three other arrows 112, the nozzle 51 can be positioned relative to the OMS 108, i.e. relative to the sensor 12. So, this positioning is also possible in up to 6 DOF. It is noted that the above mentioned relative positioning of the OMS 108 and of the nozzle 51 are optional and that the different elements shown in FIG. 1 could all be fixed to the frame 107. To be able to produce a fiber layer on multiple areas on the collector 1, it is preferred that the nozzle 51 is able to move relative to the collector 1. This may be done using the above mentioned positioning means or a different separate system (not shown) arranged to move the collector relative to the frame 107. It is noted that the collector 1 in FIG. 1 may have a top surface with different shapes such as rectangular, square shaped, disc shaped or any other suitable form depending on the structure to be produced. The top surface could be flat or curved. The collector could also have indentations or recesses, and/or it may have extensions so as to create different fibrous structures. In the embodiment of FIG. 1, the collector is mounted onto the frame 107 by means of a mounting system comprising a mount top element 201 and a mount bottom element 202. The mounting system is arranged to removably position the collector 1 relative to the frame 107. In an embodiment the mounting system is a kinematic coupling system.

Figure 2:
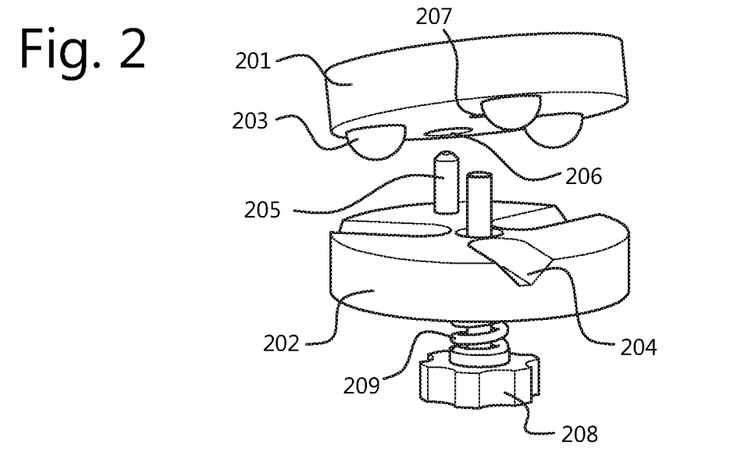
FIG. 2 shows a perspective view of the mounting system used in FIG. 1 according to an embodiment.

FIG. 2 shows a perspective view of the mounting system used in FIG. 1 according to an embodiment. In this example, the mounting system is a kinematic coupling system comprising a top element 201 and a bottom element 202. The top element 201 comprises three semi-spherical elements 203 while the bottom element 202 comprises three grooves 204. The bottom element 202 comprises an orientation pin 205, while the top element 201 comprises a clearance hole 206 cooperating with the orientation pin 206. The top element 201 comprises threaded hole 207 for receiving an outer end of a drawbar 208, the draw bar 208 being biased by means of a spring 209. The top element 201 can only be positioned and connected in one way on top of the bottom element 202. This is due to the orientation pin falling in the clearance hole 206 and the semi-spherical elements 203 falling in the grooves 204. The positioning of the mounting elements relative to each other is very accurate and reproducible as will be appreciated by the skilled person. It is noted that other types of mounting systems are conceivable.

It is also noted that the mounting system 201,202 is optional, however its presence will enable the user to remove the collector 1 from the electrospinning device and place it into another device for measuring purposes or other operations on the fibrous structure in which accurate alignment is preferred.

Figure 3:
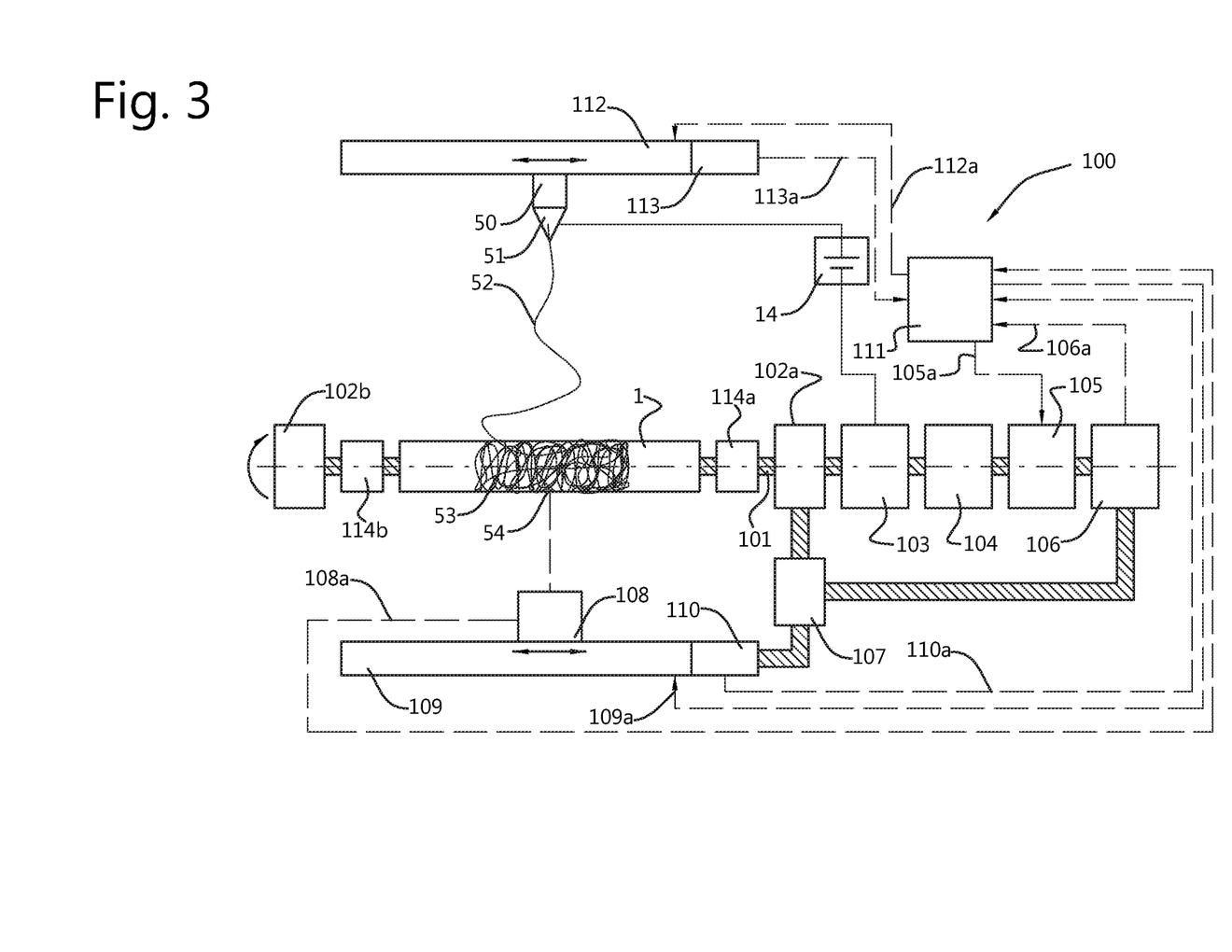
FIG. 3 schematically shows a further embodiment of the electrospinning device.

FIG. 3 schematically shows a further embodiment of the electrospinning device 100. In this embodiment, the electrospinning device 100 comprises a substantially cylindrical collector 1 which is rotatable relative to the nozzle 51. In this way, a cylindrical fibrous structure can be created during an electrospinning process. Since the collector 1 is rotatable, it is also referred to as the rotating mandrel 1. The nozzle 51 is also referred to as the spinneret 51 which may be charged with a high voltage for fiber fabrication similar to the process described with reference to FIG. 1.

As shown in FIG. 3, an electrospun fiber 52 is ejected as a droplet at (a tip of) the nozzle 51 and it flies from the nozzle 51 to the collector 1 while it stretches and solidifies in an electrostatic field between the charged nozzle 51 and the charged collector 1. On an outer surface of the collector 1 electrospun fibers are collected that form a porous fibrous layer 53 on the collector 1, also referred to as electro spun fibrous structure 53.

The electrospinning device 100 also comprises a drive shaft 101 connecting the collector 1 to actuator components 102-106. The actuator components in this example comprise amongst others two bearings 102a, 102b of which bearing 102b is optional. The bearings 102a, 102b are arranged to support the drive shaft 101 that holds the rotating collector 1. Each bearing is arranged on one end of the collector 1. The electrospinning device 100 also comprises a HV (high voltage) contact unit 103 arranged to provide a high-voltage or a grounded connection to the rotating collector 1. An HV isolating transmission 104 is arranged to decouple the HV-charged collector 1 from a motor 105 so as to protect the motor 105. The motor 105 may be a DC, AC, a stepper, or a servomotor.

In the embodiment of FIG. 3, the device 100 comprises a first connecting interface 114a and a second connection interface 114b. The first connecting interface 114a and the second connection interface 114b are also referred to as the mounting system 114. The mounting system is arranged to removably mount the collector 1 into the device 100. The mounting system 114 is preferably arranged to fix the collector 1 onto the shaft 101 in 6 DOF. So for example, the first connecting interface 114a may cause the collector 1 to be fixed in 4 DOF while the second connection interface 114b is arranged to fix the collector in 2 DOF. It is noted that the bearing 102b is optional and in that situation the second connecting interface 114b is absent; in that case the first connection interface may be arranged to fixate the collector 1 relative to the shaft 101 in 6 DOF.

The electrospinning device 100 also comprises a processor 111. The processor 111 may be arranged to send a motor setpoint signal 105a to the motor 105. The setpoint signal 105a may comprise position and/or velocity information. The actuator components further comprise a rotational position sensor 106, which may be a rotational encoder (absolute or incremental). The rotational position sensor 106 is arranged to send a rotational position signal 106a to the processor 111 that can be used by the processor 111 to trigger a measurement acquisition process at a predefined coordinate. During the measurement acquisition process a trigger is sent by the processor 111 to the OMS 108. At receipt of the trigger the OMS 108 takes a sample of the momentary distance value X and sends it back to the processor 111. In an embodiment, the OMS 108 is arranged to sample at a rate above 50 kHz; for high collector positioning speeds the sample rate is typically between 100-400 kHz. An OMS with such a high sample rate enables a thickness measurement at relatively high collector positioning speeds. Sample rates below 50 kHz are possible for situations where the measured positions are static.

The electrospinning device 100 also comprises a metrology frame 107 that, in this embodiment, forms the frame of reference for all measurements. An OMS 108 is arranged on the opposite side of the rotating collector 1 as compared to the nozzle 51. As a result, a measured position 54 is located at the other side of the rotating collector 1 as compared to the fiber collection side of the rotating collector 1. It is noted that the OMS 108 does not need to be arranged opposite the nozzle but that it is preferred that the OMS 108 is located at such a position that it does not interfere with the fiber production process by the nozzle 51. As was shown in the embodiment of FIG. 1, the OMS 108 may even be located at the same side as the nozzle relative to the collector 1 (i.e. mandrel). The OMS 108 may determine a thickness of the produced electro spun fibrous structure 53 by means of several techniques e.g. Laser Triangulation, Spectral Interference (Laser) Displacement, or Time Of Flight. Please note that the mentioned techniques could also be used in parallel.

The measured position 54 can either be a single position or multiple positions to examine the distribution of the fibrous layer buildup. This enables the device or the user thereof to produce a fibrous structure according to predefined thickness specifications. Preferably, the measurement is performed perpendicular to a local curvature of the collector 1. In this way no correction for a possible angle deviation is required on the calculation of a thickness value.

In the embodiment of FIG. 3, the OMS 108 sends a distance measurement sensor signal 108a to the processor 111, which will process these signals together with the position information 106a.

The electrospinning device 100 also comprises an OMS positioning module 109. The position of the OMS 108 can be fixed relative to a main axis of the rotating collector 1. In this case only a single position along the main axis can be measured. Alternatively, the position of the OMS 108 can be automatically adjusted by means of the OMS positioning module 109 when a number of measurement positions along the main axis is required.

The processor 111 may be arranged to send an OMS positioning setpoint signal 109a to the OMS positioning module 109. This OMS positioning setpoint signal 109a may comprise position and/or velocity information.

The electrospinning device 100 also comprises an OMS position sensor 110, which may be a linear encoder. The OMS position sensor 110 measures a position of the optical measurement system 108 relative to the metrology frame 107 and thus to the rotating collector 1. The OMS position sensor 110 may be arranged to send an OMS position signal 110a to the processor 111 that can be used by the processor 111 for triggering a measurement acquisition process at a predefined coordinate.

In this embodiment, the electrospinning device 100 also comprises a nozzle positioning module 112. It is noted that the nozzle 51 can be fixed relative to the rotating collector 1. Alternatively, the position of the nozzle 51 can be automatically adjusted by means of the nozzle positioning module 112, resulting in wider and/or more homogenous coverage of the rotating collector 1 with an electro spun fibrous structure.

The processor 111 may be arranged to send a nozzle positioning setpoint signal 112a to the nozzle positioning module 112. This nozzle positioning setpoint signal 112a may comprise position or velocity information.

In the embodiment of FIG. 3, the electrospinning device 100 also comprises a nozzle position sensor 113, which may be a linear encoder, or a rotational encoder combined with a linear driver belt. The nozzle position sensor 113 may be arranged to send a nozzle position signal 113a to the processor 111. The nozzle position signal 113a may comprise position or velocity information.

In an embodiment, the processor 111 is arranged for performing the following functions:
  receive the predefined coordinates from the user or operator;
  setpoint generation for the actuators 105, 109, 112;
  data recording from the position sensors 106, 110, 113;
  triggering of measurement acquisition;
  data recording from distance sensor(s) 108;
  thickness calculation THK=X2−X1.

Figure 4A:
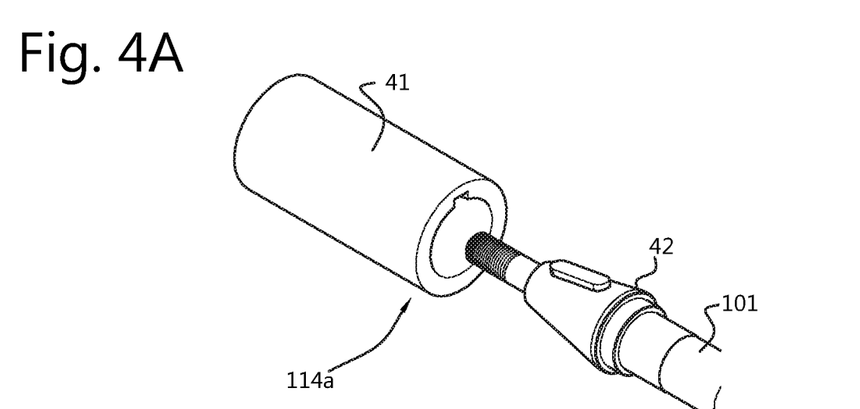
FIG. 4A is a perspective view the connection interface according to an embodiment.

FIG. 4A is a perspective view the connection interface 114a according to an embodiment. The connection interface 114a comprises a collector mount 41 and a tapered shaft mount 42. The tapered shaft mount 42 is fixed onto or a part of an outer end of the drive shaft 101.

Figure 4B:
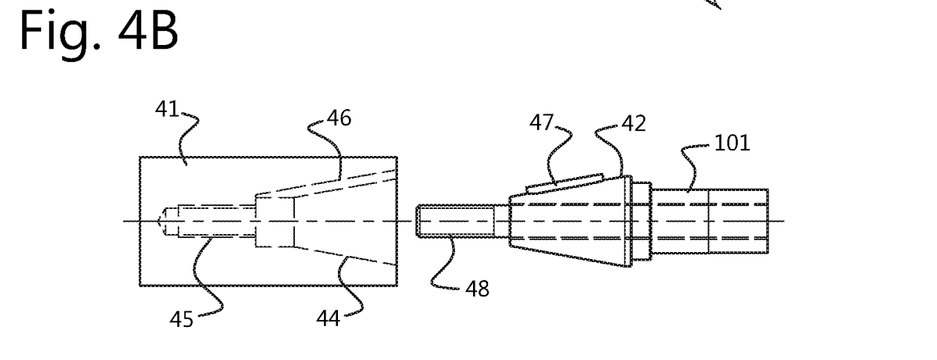
FIG. 4B schematically shows a cross section of the connection interface of FIG. 4A.

FIG. 4B schematically shows a cross section of the connection interface 114a of FIG. 4A. As can be seen from FIG. 4B, the collector mount 41 in this case is a cylinder comprising a recess for receiving part of the tapered shaft mount 42. The recess is formed by a tapered socket 44 and a threaded hole 45. A keyway 46 is arranged to receive a key 47 from the tapered shaft mount 42. FIG. 4B shows a draw bar 48 at the outer end of the tapered shaft mount 42 which can be inserted into the threaded hole 45. By inserting the tapered shaft mount 42 into the collector mount 41, the collector will be mounted onto the drive shaft with a high degree of positioning accuracy, preferably in 6 DOF.

Figure 5:
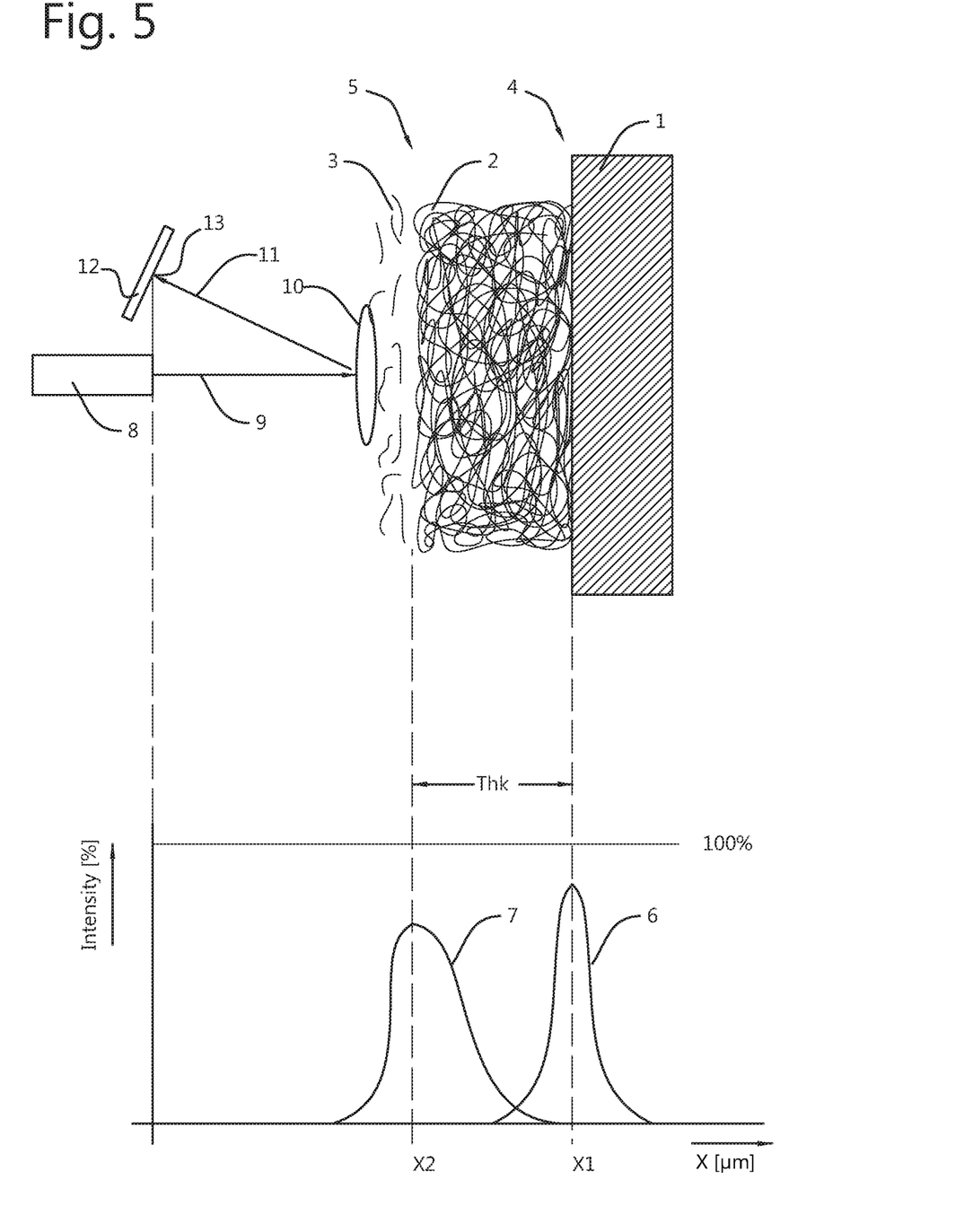
FIG. 5 schematically shows a side view of the collector, the fibrous structure and the optical measurement system comprising the laser and the optical sensor.

FIG. 5 schematically shows a side view of the collector 1, the fibrous structure and the OMS 108 comprising the laser 8 and the optical sensor 12. The optical sensor 12 in this embodiment may be an optical receiver such as a Line-, CCD-, or CMOS sensor. At the bottom of FIG. 5, a corresponding received radiation intensity is shown as a function of X where X is the distance between the reflecting surface of the object (reflection surface) and the reference point 13 of the OMS 108. The graph of FIG. 5 shows two curves that are measured on different moments in time. Curve 6 is the received radiation as a function of X when the collector is still empty before the electrospinning has started. Curve 7 is the received radiation as a function of X when the collector is (partly) covered with a fibrous structure 2 during the electrospinning process, or just after the process has stopped. In FIG. 5, X1 relates to the distance from the reference point 13 of the OMS 108 to the surface of the collector 1 (baseline) and X2 is the distance from the reference point 13 of the OMS 108 to the momentary top layer of the fibrous structure 5.

At the top part of FIG. 5, the laser beam 9 hits the top layer of the fibrous structure 2. The arrow 4 indicates the position of the surface of the collector 1 while the arrow 5 indicates the momentary top layer of the fibrous structure 2.

The top layer of fibrous structure 2 has an inconsistent fiber density as indicated with fibers 3. According to an embodiment, the laser beam cross section 10 is bigger than the expected pores in the fibrous structure 2. Typical values for the cross section of the laser beam 9 are in a range between 25-5000 μm. The preferred cross section of the laser beam is large enough to cover a number of fibers and pores at the momentary top layer of the electro spun fibrous structure to yield sufficient reflection (detectable amount of radiation intensity) from the momentary top layer of the electro spun fibrous structure, although small enough to be able to distinguish between small height (distance) differences in a region of interest on the momentary top layer of the electro spun fibrous structure.

Please note that in FIG. 5, the cross section of the beam 9 is exaggerated at the end by the oval 10.

In an embodiment the OMS processes the reflection curve 6 or 7 to determine the distance X1 or X2 corresponding with the first peak in each respective curve, and output this distance value to the processor 111. Triangulation methods can be used by the OMS to calculate the values of X1 and X2. The processor 111 processes the received distances to calculate the thickness of the fibrous structure. The thickness THK, see FIG. 5, is determined using the formula: THK=X2−X1.

The inventors have realized that a response of a laser triangulation measurement method is a bell-curve (reflection curve) signal resulting from a fibrous (porous) structure that gives little reflection from the top (more porous) layers of fibers, increased reflection from more dense sublayers of fibers, and decreased reflection from deeper layers of the fibrous structure. The distance (between the reference point 13 of the OMS and the reflection surface of the object (collector 1 or the momentary top layer of the fibrous structure 5) can be derived from the corresponding bell-curves e.g. by taking the position of the peak of the corresponding curves 6 or 7.

Figure 6:
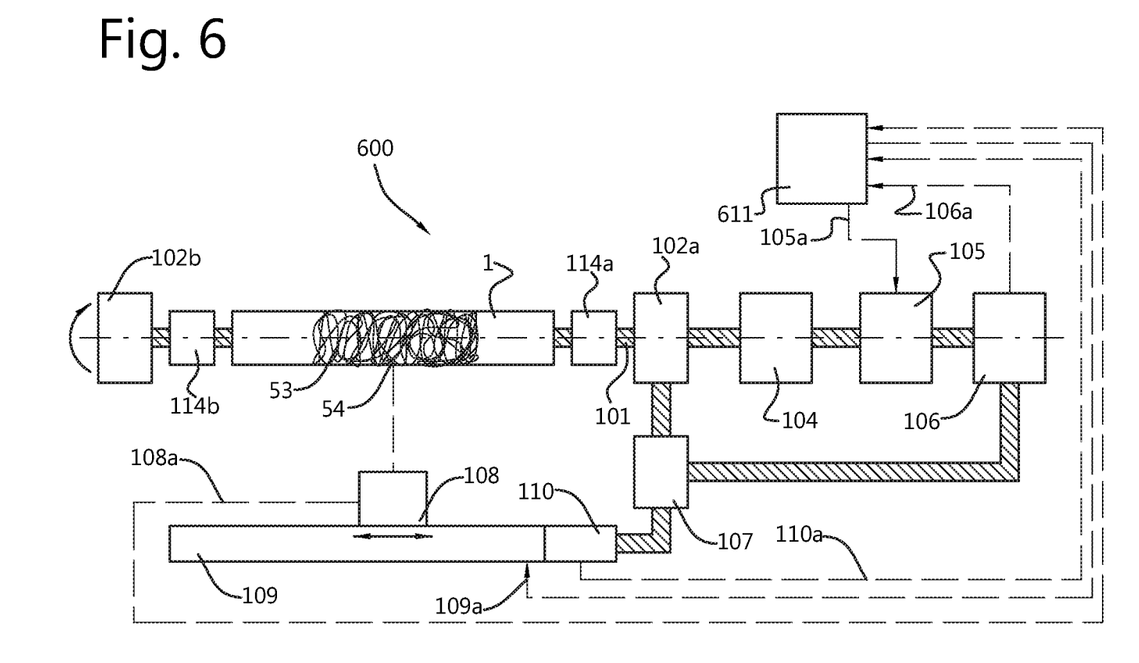
FIG. 6 schematically shows a measuring device for measuring a thickness of a fibrous structure according to an embodiment of the invention.

FIG. 6 schematically shows a measuring device 600 for measuring a thickness of a fibrous structure according to an embodiment of the invention. In this embodiment, the measuring device 600 comprises a frame 107, a rotatable drive shaft 101, a carrier for supporting the fibrous structure, the carrier being detachable from the frame and/or the drive shaft. The device 600 also comprises an OMS 108 movably coupled to the frame 107 and arranged to measure a baseline distance between the carrier and the OMS 108 for a plurality of locations on the carrier, and arranged to measure a distance between a top layer of the fibrous structure and the OMS 108 at the plurality of locations. The measuring device 600 also comprises a processor 611 arranged to receive the measured baseline distance and the top layer distance for the plurality of locations from the optical measurement system and to calculate a thickness of the electro spun material for all the predefined locations.

As can be seen from FIG. 6, the measuring device 600 resembles the electrospinning device of FIG. 3 to a certain extent. However, the measuring device 600 does not comprise the nozzle 51, the container 50, the positioning 112 of the nozzle, the voltage supply system 14 nor the HV contact unit 103. It is noted that the bearing 102b and the mounting element 114b are optional in FIG. 6.

Figure 7:
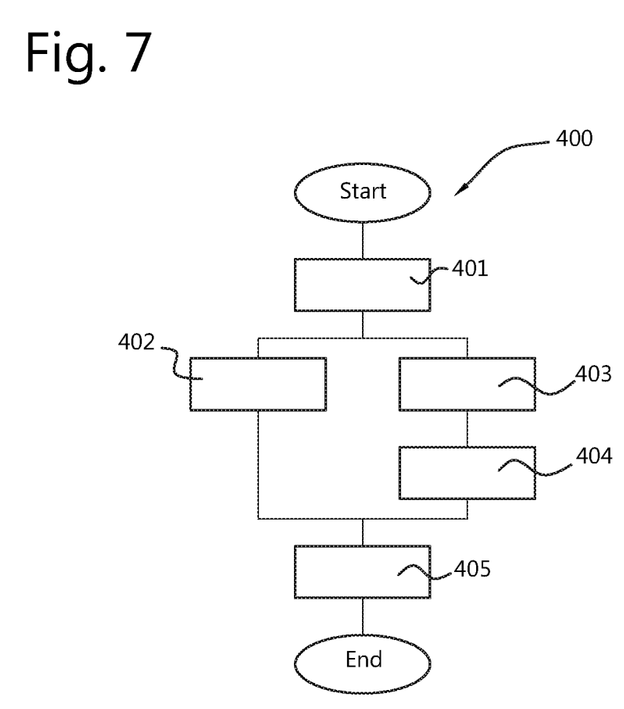
FIG. 7 shows a flow chart of a method of producing a fibrous structure according to an embodiment.

FIG. 7 shows a flow chart of a method of producing a fibrous structure according to an embodiment. The method could be performed using the electrospinning device 100. The method 400 comprises optically measuring, see block 401, a first (baseline) distance between a collector of an electrospinning device and the optical measurement system for at least one location on a surface of the collector of the electro spinning device. Block 401 is followed by creating a fibrous structure on the collector by way of electrospinning, see block 402. While electrospinning, a second (momentary top layer) distance between a momentary top layer of the fibrous structure and the optical measurement system for the at least one location is optically measured, see block 403. The measured first and second distance from the optical measurement system are processed for the one or more locations during the electrospinning process to calculate a momentary thickness of the fibrous structure for all the one or more locations, see block 404. Optionally the method comprises stopping the electrospinning process, see block 405, depending on the determined momentary thickness at at least one of the predefined locations. Electrospinning can be continued at certain areas of the collector while electrospinning at other areas could be stopped depending on the required local thickness.

Figure 8:
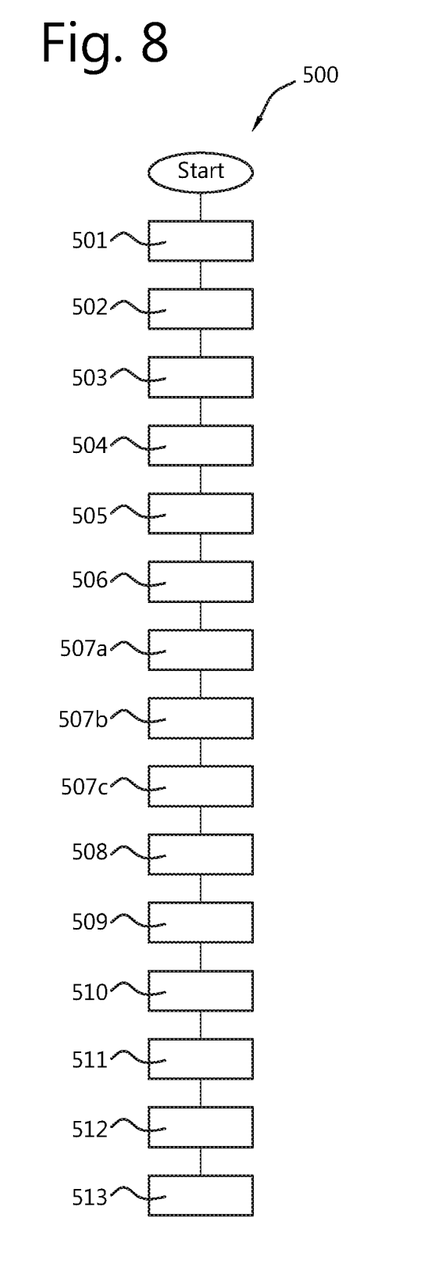
FIG. 8 shows a flow chart of a method according to a specific embodiment wherein a rotational collector is used.

FIG. 8 shows a flow chart of a method 500 according to a specific embodiment wherein a rotational collector is used. The method 500 starts with a block 501 indicating that a collector is attached/fixed to the driveshaft of the setup of FIG. 3. Next, in a step 502, the collector 1 is positioned in a desired starting position. A block 503 indicates that the readings from sensors 106 and 110 are set to zero in the processor 111. At block 504 a plurality of predefined coordinates is programmed in the processor by e.g. a user. These predefined coordinates can be multiple measurement positions over the circumference of the collector 1. In an embodiment multiple sensors are used to measure distances at different measurement positions in parallel. Block 505 indicates that the desired OMS positions (relative to the zero position) at which a measurement acquisition process should be triggered are programmed for OMS positioning. Note that this positioning/position programming is not required when the OMS 108 is at a fixed position. A block 506 indicates the starting of the rotation of the collector 1 and to wait for it to reach a desired rotational speed. The rotational angle of the rotating collector 1 can be accurately tracked by readout of the rotational position sensor 106 by the processor 111. A block 507 indicates the starting of the measurement process. A measurement point can be defined by the measured distance between the OMS 108 and the reflection surface 4, 5. A block 507A indicates the triggering, acquiring and recording of a measurement point for a plurality of predefined coordinates. A block 507B indicates that the readings from the OMS 108 can optionally be set to zero in the processor 111.

A number of measurement points can be taken for a plurality predefined coordinates on an empty collector for averaging purposes (determining the baseline distance), see block 507C.

Block 508 indicates the starting of the electrospinning process. Fibers will start to collect on the rotating collector 1 forming an electro spun fibrous structure 53 (with uneven distribution on a micro scale). If desired, the nozzle 51 can be positioned at programmed positions or can be moved at a specific speed. Block 509 indicates that during the collection of fibers the distance between OMS and reflection surface is recorded for a plurality of predefined coordinates. As the thickness of the electro spun fibrous structure 53 increases during the electrospinning process, the distance between the OMS 108 and the reflected surface decreases. The momentary thickness of the electro spun fibrous structure may be defined as the momentary distance minus the baseline distance. A block 510 indicates that after electrospinning for a desired time, or reaching a desired thickness, the electrospinning process can be stopped (or interrupted). Optionally, the collector 1 keeps rotating after the electrospinning process has stopped, and a number of measurement points at a plurality of predefined coordinates are taken on the electro spun fibrous structure for averaging purposes. At block 511 the measurement process is stopped. At block 512 the rotating is stopped and at block 513 the collector 1 is detached from the driveshaft 101, see also FIG. 3. The distance (between the reference point 13 of the OMS and the object (collector 1 or the momentary top layer of the fibrous structure 5) can be derived from the corresponding bell-curves e.g. by taking the position of the peak of the corresponding curves 6 or 7.

In an embodiment, each measured distance is derived from an individual reflection curve detected by the sensor of the OMS, recorded after receiving a trigger to start a measurement acquisition process. The distance value X may be derived from the reflection curve by taking the position of the first peak in the reflection curve signal (closest to the OMS). Any additional peaks in the reflection curve signals are left out of account. The distance value X relating to the position of the first peak represents the distance between the reference point 13 of the OMS and the object.

If the sensor 12 and the collector surface 4 are able to move relatively to each other, distance information at different spatial coordinates can be obtained. In this way accurate measurement of structure thickness at different spatial coordinates on the structure can be achieved. In such cases the measurement method/device must have a sufficiently small field of view to detect local variations in thickness. This can be achieved by using a laser spot size suitable for the size of the region of interest.

The contactless measurement method described above has many advantages. However, contactless methods must allow for sufficient distance between the collector 1 and the OMS 108 to avoid interference of the sensor/device with the electrospinning process since:

The device 100 can alter the electric field when it is too close to the nozzle 51 or collector 1;

The device 100 can build up static electric charge and starting to act as an electrode (attracting or repelling fibers onto the device rather than on the collector);

The device 100 can get damaged by electric discharges between the (high voltage) nozzle 51 or collector 1 and the device 100.

Another solution to avoid interference of the sensor/device with the electrospinning process is to produce the fibrous structure in an electrospinning device which comprises a demountable collector that can be placed into the measuring device 600 shown in FIG. 6. The thickness can then be measured using a method as described below.

Figure 9:
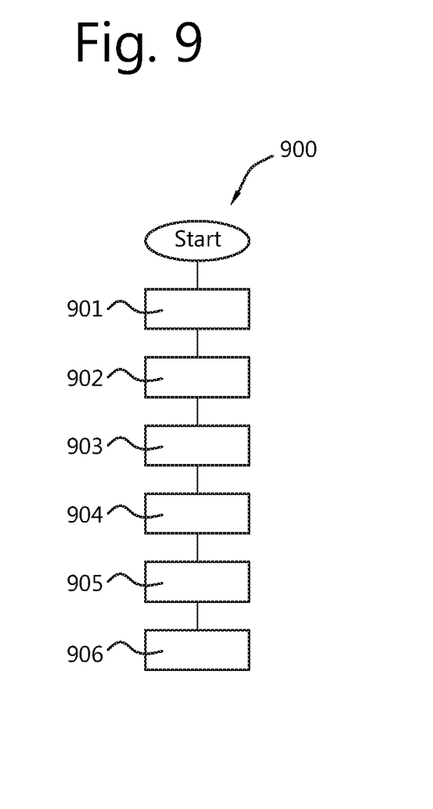
FIG. 9 shows a method of measuring a thickness of a fibrous structure according to an embodiment.

FIG. 9 shows a method 900 of measuring a thickness of a fibrous structure, the method comprising:

mounting a collector without an electrospun structure on it into a measurement device comprising an optical measurement system, see block 901 optically measuring a baseline distance between a surface of the collector and the optical measurement system at least one location on the collector, see block 902;

removing the collector from the measurement device and placing the collector in an electrospinning device for creation of an electro spun structure on the collector, see block 903;

mounting the collector with the electrospun structure on it into the measurement device, see block 904;

optically measuring a top layer distance between a top layer of the fibrous structure and the optical measurement system at the at least one location, see block 905;

processing the measured baseline and top layer distance for the at least one location from the optical measurement system to determine a thickness of the fibrous structure, see block 906.

The method of measuring a thickness of a fibrous structure as shown in FIG. 9 is not being performed while producing, so this method is referred to as an offline thickness measuring method.

The in-situ and offline local thickness measurements described above preferably have a high degree of accuracy over a wide range. The thickness of an electro spun structure can be as high as several millimetres while the build-up over time of this structure is determined by the pore size and fiber diameter itself and these typically lie between a few tens of nanometres and a few tens of micrometres. The preferred accuracy of thickness measurement for process adjustment or quality control purposes is typically 10 µm-50 µm. This high degree of accuracy may be achieved by:

Using accurate distance measurement methods, for instance laser triangulation, spectral interference etcetera;

Accurate positioning of the collector and the optical measurement system;

High speed triggering of measurement acquisition for increased repeatability accuracy at high positioning speeds of the OMS and/or the collector;

Ability to average the thickness over numerous measurement points;

Ability to measure distances over an area that in average is representative for the region of interest.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. In the device claims several means are enumerated. These means may be embodied by one and the same item of hardware or software. The mere fact that certain measures are recited in mutually different dependent claims does not indicate that a combination of these measures cannot be used to advantage.

The invention claimed is:

1. An electrospinning device comprising:
a container for holding a liquid comprising a polymer melt or a polymer solution;
a nozzle configured to outlet a stream of the liquid from the container;
a collector for collecting the liquid in the form of electro spun material coming from the nozzle during an electrospinning process so as to form a fibrous structure on a surface of the collector;
a voltage supply system configured to create a voltage difference between the nozzle and the collector;
an optical measurement system, wherein the optical measurement system comprises a laser device and an optical sensor, wherein the laser device is configured to send a light beam towards the collector and the sensor is configured to measure reflected radiation of the light beam coming from the collector and/or the fibrous structure, the optical measurement system being configured to measure a baseline distance between the surface of the collector and the optical measurement system at a plurality of predefined locations so as to form an initial height map of at least part of the collector, and to repeatedly measure a momentary distance between a momentary top layer of the fibrous structure being formed and the optical measurement system at the plurality of predefined locations during the electrospinning process; and a processor configured to receive the measured baseline distances and the momentary distances from the optical measurement system and to calculate a momentary thickness of the fibrous structure for the plurality of locations.

2. The electrospinning device according to claim 1, wherein the collector is movably arranged relative to the nozzle.

3. The electrospinning device according to claim 1, wherein the optical measurement system is movably arranged relative to the surface of the collector.

4. The electrospinning device according to claim 1, wherein the optical measurement system is statically arranged relative to a surface of the collector.

5. The electrospinning device according to claim 1, wherein the processor is configured to control at least one out of the following:
the voltage difference;
a material feed of the liquid through the nozzle; and
a position of the nozzle relative to the collector;
in dependency on the calculated momentary thickness of the fibrous structure at the plurality of predefined locations.

6. The electrospinning device according to claim 1, wherein the processor is configured to control the voltage supply system so as to stop the electrospinning process once a required thickness of the fibrous structure has been reached.

7. The electrospinning device according to claim 1, wherein the collector is rotatable around a rotation axis.

8. The electrospinning device according to claim 1, wherein the sensor is a 1D or 2D sensor array configured to detect the radiation along at least one axis, wherein the processor is configured to translate intensities of the radiation along the at least one axis of the sensor into a reflection curve and to detect a first peak in the reflection curve, and wherein the first peak is used by the processor to determine the distance between either the collector or the momentary top layer of the fibrous structure and the optical measurement system.

9. The electrospinning device according to claim 1, wherein the optical sensor comprises a laser triangulation sensor.

10. The electrospinning device according to claim 1, wherein the laser device is configured to produce a laser beam having a cross section between 25 µm and 5000 µm.

11. The electrospinning device according to claim 1, wherein the optical measurement system is movable relative to the surface of the collector so as to measure the baseline distance and the momentary distance at the plurality of locations, the plurality of locations corresponding to a plurality of predefined coordinates.

12. The electrospinning device according to claim 11, further comprising a user interface, wherein the processor is configured to receive the predefined coordinates from a user via the user interface.

13. The electrospinning device according to claim 1, further comprising a position measurement system configured to measure a position of the collector relative to the optical measurement system, wherein the processor is configured to receive position information of the collector from the position measurement system and to trigger the optical measurement system in dependency on the received position information.

14. The electrospinning device according to claim 1, wherein the optical measuring system comprises a measuring device for measuring a thickness of the fibrous structure, the measuring device comprising:
a frame;
a rotatable drive shaft; and
a carrier, in the form of the collector, for supporting the fibrous structure, the carrier being detachable from the frame and/or the drive shaft,
wherein the optical measurement system is movably coupled to the frame and configured to measure a baseline distance between the carrier and the optical measurement system for a plurality of locations on the carrier, and is configured to measure a top layer distance between a top layer of the fibrous structure and the optical measurement system, at the plurality of locations on the carrier, and
wherein the processor is configured to receive the measured baseline carrier distance and the top layer distance for the plurality of locations on the carrier from the optical measurement system and to calculate a thickness of the fibrous structure for all the plurality of locations on the carrier.

15. The electrospinning device according to claim 14, further comprising a position measurement system configured to measure a position of the carrier relative to the optical measurement system, wherein the processor is configured to receive position information of the carrier from the position measurement system and to trigger the optical measurement system in dependency on the received position information.

16. The electrospinning device according to claim 14, further comprising a mounting system to install the carrier with a fixed orientation relative to the frame.

17. The electrospinning device according to claim 1, wherein the processor is configured to control a movement of the collector relative to the nozzle so as to produce different thicknesses of the fibrous structure at different locations.

18. A method of producing a fibrous structure using the electrospinning device according to claim 1, the method comprising:
providing the electrospinning device according to claim 1;
optically measuring a baseline distance between the collector and the optical measurement system for the plurality of locations on the surface of the collector so as to form the initial height map;
creating a fibrous structure on the surface of the collector by way of electrospinning the liquid through the nozzle using the electrospinning device;
during said electrospinning, optically measuring a momentary distance between a momentary top layer of the fibrous structure and the optical measurement system for the plurality of locations; and
processing the measured baseline distance and the momentary distance for the plurality of locations during the electrospinning process to calculate a momentary thickness of the fibrous structure for the plurality of locations.

19. The method of producing according to claim 18, wherein the method comprises:
stopping the electrospinning process, or only continuing the electrospinning at certain areas of the collector, depending on the calculated momentary thickness for the plurality of locations.

20. A method of measuring a thickness of a fibrous structure using the electrospinning device according to claim 1, the method comprising:

mounting the collector without an electro spun fibrous structure on it into a measurement device of the optical measurement system;
optically measuring a baseline distance between the surface of the collector and the optical measurement system at the plurality of locations on the collector so as to form the initial height map;
removing the collector from the measurement device and placing the collector in the electrospinning device for creation of the electro spun fibrous structure on the collector;
mounting the collector with the electro spun fibrous structure on it into the measurement device;
optically measuring a top layer distance between a top layer of the fibrous structure and the optical measurement system at the plurality of locations; and
processing the measured baseline distance and the top layer distance for the plurality of locations to calculate a thickness of the fibrous structure at the plurality of locations.

* * * * *